UNITED STATES PATENT OFFICE.

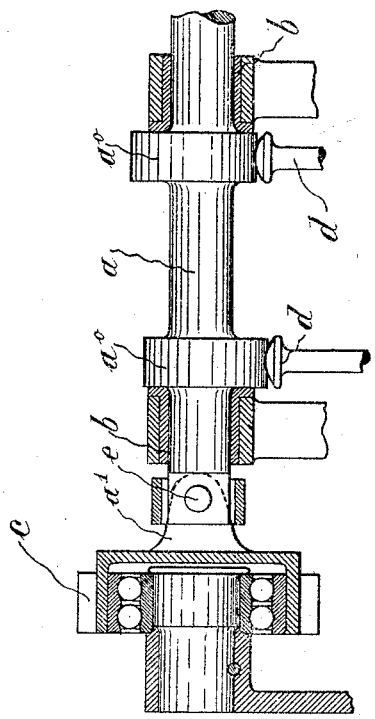

HENRI VICTOR JULES JOUFFRET, OF NEUILLY-SUR-SEINE, FRANCE.

VALVE-OPERATING MECHANISM.

1,368,161.  Specification of Letters Patent.  Patented Feb. 8, 1921.

Application filed May 29, 1919. Serial No. 300,721.

*To all whom it may concern:*

Be it known that I, HENRI VICTOR JULES JOUFFRET, engineer, citizen of the French Republic, residing in Neuilly-sur-Seine, Department of Seine, France, have invented certain new and useful Improvements in Valve-Operating Mechanism, of which the following is a specification.

This invention relates to distributing apparatus or valve operating mechanism actuated by means of cam shafts and refers more particularly to that type of such apparatus in which the cams come into direct contact with the parts which they operate.

The principal object of the invention is so to construct apparatus of the class in question that it enables access to be obtained with facility to the parts controlled thereby.

The invention consists essentially in making the cam shaft of distributing apparatus or valve controlling mechanism of the class in question in two parts, one of which is not capable of being easily dismounted and constitutes the transmission member, while the other is connected to the first by a jointed connection and carries the cams, in such a way that by first removing the housings or casings of the bearings of the shaft, the parts which the cams are adapted to control can be removed.

The invention also refers to other constructional features besides the principal feature just mentioned, and these will be more fully described hereafter.

It includes certain embodiments of the said features and, as new industrial products, distributing or valve controlling apparatus comprising the said features, special parts suitable for their construction, and motors provided with such apparatus.

In order that the invention may be more clearly understood, I will now proceed to describe the same with reference to the accompanying drawing, which however, it is to be understood, is given merely by way of example.

The drawing shows, in elevation, the valve controlling mechanism of an internal combustion engine constructed according to my present invention.

In the method of carrying the same into effect more particularly illustrated in the drawing, the distributing or valve controlling apparatus comprises a cam shaft $a$ journaled in bearings $b$, rotated by means of a toothed pinion $c$ fixed thereon, the arrangement being such that the cams $a^0$ directly operate the stems $d$ of the valve of the motor. In order to enable access to be obtained easily to the valve without dismounting the cam shaft, so that the valve may be removed if desired, I adopt the following or some analogous construction.

In place of providing an ordinary cam shaft, I make the shaft in two pieces, jointed together, either by means of a simple pivotal joint $e$ or by a Cardan joint. One of the pieces $a$ carries the cams $a^0$ and is journaled in bearings $b$, while the other $a^1$ is integral with the toothed pinion $c$.

It will be seen that with this construction the cam shaft $a$ operates exactly as an ordinary cam shaft, but that if it is desired to remove one of the valves, it is sufficient, after having removed the casing or housing of the bearings $b$, to turn the piece $a$ upon its joint $e$.

As will be readily understood, the invention is not limited in any way to the methods of carrying the same into effect which have been more particularly described. It includes on the contrary all modifications. For instance, I may substitute for the hinged joint an ordinary jointed connection, sleeve coupling or its equivalent.

Having now particularly described and ascertained the nature of my said invention and in what manner the same is to be performed, I declare that what I claim is:—

1. In a valve actuating apparatus, a cam shaft composed of two separable sections, power transmitting mechanism on one of said sections, cams carried by the other of said sections adapted to directly operate the valves, demountable bearings for the shaft section carrying the cams and a hinged connection between said shaft sections whereby said cam carrying section may be moved about said hinged connection after the demounting of said bearings.

2. In a valve actuating apparatus for internal combustion engines, a cam shaft comprising two sections, and means for pivotally connecting said sections whereby one of said sections may be moved about said connecting means to freely expose the valve parts coacting with the cam.

3. In a valve actuating apparatus for internal combustion engines, a cam shaft comprising two separable sections, power transmitting mechanism on one of said sections, cams carried by the other section adapted to operate the valves of the engine, and means connecting said sections whereby the cam carrying section may be readily moved away from the valves without disconnecting said means.

In testimony thereof I have hereunto set my hand in presence of two subscribing witnesses.

HENRI VICTOR JULES JOUFFRET.

Witnesses:
   EUGÈNE JULLIEN,
   CHAS. P. PRESSLY.